Jan. 19, 1937.  A. W. COFFMAN  2,068,533

LAMINATED ARTICLE

Filed June 11, 1935

Inventor.
Alden W. Coffman
by Jos. H. Churchill
atty.

Patented Jan. 19, 1937

2,068,533

UNITED STATES PATENT OFFICE 2,068,533

LAMINATED ARTICLE

Alden W. Coffman, Pittsburgh, Pa., assignor to H. H. Robertson Company, Pittsburgh, Pa., a corporation of Pennsylvania Application June 11, 1935, Serial No. 26,079

5 Claims. (Cl. 154—43)

This invention relates to a laminated article and method of making the same.

In general, the object of the invention is to provide a novel and improved laminated article having superior bonding strength between the laminations thereof, having superior ability to withstand temperature changes, and to withstand flexure, which may be conveniently manufactured, and whose construction lends itself to the use of a much wider variety of component members in producing the laminated product.

A further object of the invention is to provide a novel and improved resin laminated article possessing increased bonding strength, improved ability to withstand moisture and temperature changes, and improved ability to withstand flexure as compared with prior resin laminated articles of which I am aware.

A still further object of the invention is to provide a novel and improved method of producing the improved laminated articles by which such articles may be produced with more convenience and in a superior manner than by other prior processes of which I am aware.

In the drawing which illustrates more or less diagrammatically laminated articles embodying the present invention, Fig. 1 is a development in plan illustrating the several component parts of the laminated product;

Figure 1:
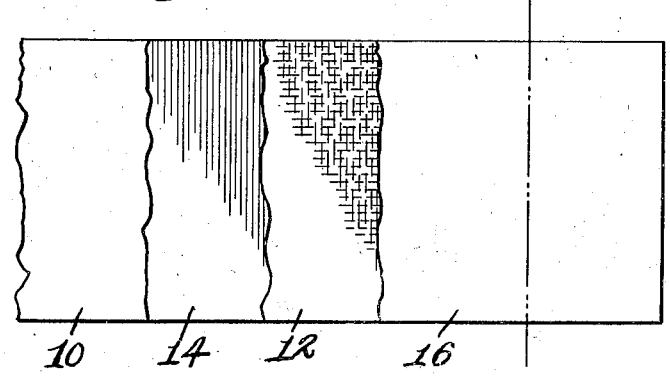
Figure 2:
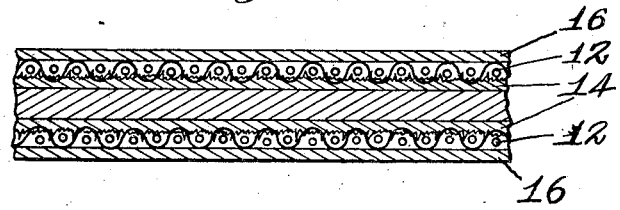
Fig. 2 is a sectional detail on the line 2—2, of Fig. 1.
Figure 3:
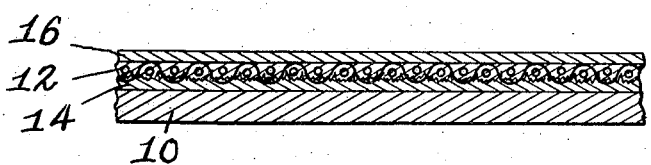
Fig. 3 is a sectional view of a resin laminated sheet embodying the invention.

Prior to the present invention laminated articles, particularly laminated sheets, have been extensively used in the construction of furniture, bus bodies, ship construction, railroad cars, and for various other purposes, in which a decorative sheet or material was required. Essentially this prior laminated sheet material comprised a reenforcing steel sheet and an outer decorative layer which was adhesively secured to the steel sheet by various adhesive materials. The outer layer or component member of the laminated product usually comprised laminated resin such as bakelite, usually made by building up a layer of a plurality of paper sheets impregnated with the resin and secured together under heat and pressure. In addition plywood and also thin wood veneer have been used as the outer layer of such prior laminated products.

The present invention aims to provide an improved laminated product, particularly with respect to the bonding strength between the laminations, and contemplates a structure in which there is provided a metal reenforcing member such as steel, bronze, brass, or any metal capable of alloying with a metal adhesive. The invention further contemplates a fibrous layer affixed to the aforesaid metal reenforcing member by a metal adhesive. The metal adhesive may comprise zinc, tin, lead, cadmium, or any alloys thereof, or any other suitable alloys capable of bonding with the metal reenforcing member.

To the fibrous layer of the structure thus far described, an outer layer of any desired composition may be affixed to produce the improved laminated article.

The outer layer may comprise a unitary single ply, or it may itself be composed of a plurality of component members, such as plywood for example, and the outer layer may or may not be coated with coating materials such as resin. Further the composition of the outer layer itself may be either organic such as rubber, resin, or wood veneer, or any other suitable material depending upon the use to which the improved laminated article is to be put, or on the other hand it may be composed of inorganic materials such as marble, glass, and the like.

Referring to the drawing, 10 represents a metal member which may take any form, herein illustrated as comprising a sheet. The metal member may comprise steel, bronze, brass, or any metal capable of alloying with a metal adhesive, and for convenience of description will be hereinafter referred to as a steel sheet. The steel sheet is provided upon one or both sides thereof with a layer 12 of fibrous material bonded to the steel sheet by an interposed layer 14 of metal adhesive. The metal adhesive may comprise zinc, tin, lead, cadmium, or any alloys thereof, or any other suitable alloy capable of bonding with the metal member 10, and the metal adhesive layer 14 may be applied to the steel sheet 10 in any usual or preferred manner, such for example as by any of the commercial forms of processes now used for the application of zinc, tin, lead, or alloying coating. While the metal adhesive layer 14 is in a molten condition, the fibrous layer 12 may be applied to the metal adhesive layer 14 under sufficient pressure to effect an interpenetration of the fibers into the metal adhesive and of the metal adhesive into the fibers, so that upon subsequent cooling the fibrous layer 12 and the metal adhesive layer 14 are securely interlocked.

In order to produce the present laminated product, I may utilize as an outer layer 16 any desired material, either organic or inorganic in nature, depending upon the use to which the ultimate product or article is to be put, as for example, I may utilize as an outer layer rubber, resin, such as bakelite, wood, veneer, any form of fabric or fibrous material, marble, glass, and the like. The outer layer may be in the form of a single ply, or may itself be composed of a plurality of component members such as plywood for example, and any usual or any preferred adhesive material may be utilized to effect the union or bonding of the outer layer 16 to the fibrous layer 12. In the application of this adhesive to the fibrous layer 12, it is desirable that the adhesive should be applied in such an amount and in such manner that it will impregnate the fibrous layer and become adhesively secured to the underlying metal adhesive layer 14, thus further increasing the efficiency with which the outer layer 16 is attached and also reenforcing and increasing the strength of the intermediate fibrous layer 12. In the application of the outer layer 16 I prefer to utilize pressure, and the amount of pressure will vary according to the particular product being produced and the character of adhesive employed in producing the product. This pressure may vary from a few pounds per square inch up to from 1000 to 2000 pounds per square inch.

Among the various laminated articles which may be produced embodying the present invention, I may utilize wood veneer as the outer layer 16 and it may be adhesively affixed to the underlying fibrous layer 12 by suitable adhesives such as casein, blood albumen, or animal glues, or by resins such for example as the well-known phenolic formaldehyde resins, the urea formaldehyde resins, and the vinyl resins. The laminated product thus produced finds particular use for all of the purposes for which laminated wood veneer products of the prior art have been used, including for example in the furniture art, for wall paneling, and for various interior finishes such as is utilized in ships, railroad cars, etc., and as above stated the improved product possesses the superior characteristics inherent in all of the laminated products embodying the present invention in which the outer layer is laminated to the underlying fibrous layer 12.

Another embodiment of the present invention may be produced by utilizing glass as the outer layer or member 16, and the glass layer may be adhesively affixed to the underlying fibrous layer 12 utilizing any of the known adhesives of the general type used in cementing the glass, including compositions which are now commonly used in the production of shatter-proof glass. In the application of the glass to the underlying fibrous layer 12 relatively low pressure is utilized and it is also preferred to utilize a fibrous layer 12 of a relatively thin nature, such for example as that produced in utilizing cotton cloth as the fibrous layer 12. The laminated glass surface product produced is particularly useful as wall-paneling, presenting a washable glass surface, and the character of the glass may be varied to present a designed and/or colored appearance, and in addition to its use as wall-paneling, the product may also be used with advantage as a bureau top, desk top, and as a covering for other surfaces. The reenforcement provided by the steel sheet 10 strengthens the glass and enables thin sections of glass to be successfully used with reduced liability of fracture during handling and in use.

Another embodiment of the invention may be produced by utilizing thin sections of marble or similar inorganic material as the outer layer 16 in the production of the present laminated product. A product may be produced which is similar in characteristics to the glass laminated product above referred to. The same type of adhesives may be utilized as indicated in connection with the production of the glass laminated product. The use of a thin section of marble reenforced by the steel sheet 10 enables a decorative material to be produced and to be used for the production of decorated surfaces in a much more economical manner and involving less expense than commercial forms of marble blocks heretofore obtainable. In addition the liability of the marble to become fractured is substantially decreased.

Another embodiment of the invention comprises a series of laminated products produced by utilizing rubber or synthetic rubber-like products, such as those known to the trade as Duprene and Thiokol, as the outer layer 16 of the laminated article. The rubber or synthetic rubber-like layers 16 may be adhesively affixed to the underlying fibrous layer 12 utilizing suitable cementitious materials, and for some purposes may be vulcanized by heat and pressure, or otherwise. For some purposes it may be desirable that the rubber or synthetic rubber-like layers be applied as uncured compositions to the fibrous layer 12 and vulcanized in place. The laminated products produced may be utilized with advantage in the construction of containers, tanks, protected pipes, and for other general purposes where the rubber or rubber-like surface may be useful.

Another embodiment of the invention comprises a laminated product in which an outer layer 16 of any desired composition is adhesively secured to the underlying fibrous layer 12 by a synthetic resin, such for example as a phenolic formaldehyde resin, a urea formaldehyde resin, vinyl resins, and the like. In the application of the outer layer 16, I prefer to impregnate the fibrous layer 12 with the resin and unite the outer layer by means of heat and pressure. For some purposes it is desirable that the finished laminated product be provided with a resin surface, and in order to produce such a product I prefer to impregnate the outer layer 16 before application to the fibrous layer 12 with the synthetic resin. Furthermore, when such is the case the impregnation of the fibrous layer 12 may be accomplished by penetration of excess resin from the saturated outer layer or layers into the fibrous layer due to the application of heat and pressure with the subsequent curing of the resin. This outer layer 16 which is to be saturated with resin and attached to the fibrous layer 12 may be colored or decoratively designed fabric, paper, wood veneers, or similar materials.

All of the laminated products embodying the present invention are characterized by superior bonding strength between the laminations thereof, due to the superior bond between the fibrous layer 12 and steel sheet 10 by reason of the interpenetration of the metal adhesive and fibrous layer and the alloying of the metal adhesive to the steel sheet. The fibrous layer 12 provides a superior surface to which the outer layer 16 may be laminated and as a result of the structure of the present product, the latter possesses superior ability to withstand temperature changes and to withstand flexure. In addition as will be apparent, the structure lends itself particularly to the production of a wide variety of special laminated products heretofore incapable of successful and economical commercial production.

While the preferred embodiment of the invention has been herein illustrated and described it will be understood that the invention may be embodied in other forms within the scope of the following claims.

Having thus described the invention, what is claimed is:

1. As a new article of manufacture, a laminated article capable of withstanding substantial temperature changes without delamination, comprising a metal article, a preformed layer superimposed thereon, and an intermediate cushioning and expansion equalizing layer comprising a fibrous layer to which the preformed layer is affixed to form a unit therewith, and a metallic adhesive layer alloyed with the metal article and keyed to the fibrous layer whereby stresses resulting from the differential expansion and contraction of the metallic article and the superimposed layer are transmitted from the metallic article directly through the metallic adhesive layer to the fibrous layer.

2. As a new article of manufacture, a laminated article capable of withstanding substantial temperature changes without delamination, comprising a metal article, a preformed layer superimposed thereon, comprising wood veneer, and an intermediate cushioning and expansion equalizing layer comprising a fibrous layer to which the preformed layer is affixed to form a unit therewith, and a metallic adhesive layer alloyed with the metal article and keyed to the fibrous layer whereby stresses resulting from the differential expansion and contraction of the metallic article and the superimposed layer are transmitted from the metallic article directly through the metallic adhesive layer to the fibrous layer.

3. As a new article of manufacture, a laminated article capable of withstanding substantial temperature changes without delamination, comprising a metal article, a preformed layer superimposed thereon, comprising marble, and an intermediate cushioning and expansion equalizing layer comprising a fibrous layer to which the preformed layer is affixed to form a unit therewith, and a metallic adhesive layer alloyed with the metal article and keyed to the fibrous layer whereby stresses resulting from the differential expansion and contraction of the metallic article and the superimposed layer are transmitted from the metallic article directly through the metallic adhesive layer to the fibrous layer.

4. As a new article of manufacture, a laminated article capable of withstanding substantial temperature changes without delamination, comprising a metal article, a preformed layer superimposed thereon, comprising glass, and an intermediate cushioning and expansion equalizing layer comprising a fibrous layer to which the preformed layer is affixed to form a unit therewith, and a metallic adhesive layer alloyed with the metal article and keyed to the fibrous layer whereby stresses resulting from the differential expansion and contraction of the metallic article and the superimposed layer are transmitted from the metallic article directly through the metallic adhesive layer to the fibrous layer.

5. As a new article of manufacture, a laminated article capable of withstanding substantial temperature changes without delamination, comprising a metal article, a superimposed layer comprising a preformed resinous sheet, and an intermediate cushioning and expansion equalizing layer comprising a fibrous layer impregnated with resinous material and to which the superimposed layer is affixed to form a unit therewith, and a metallic adhesive layer alloyed with the metal article and keyed to the fibrous layer whereby stresses resulting from the differential expansion and contraction of the metallic article and the superimposed layer are transmitted from the metallic article directly through the metallic adhesive layer to the fibrous layer.

ALDEN W. COFFMAN.